Patented Jan. 3, 1950

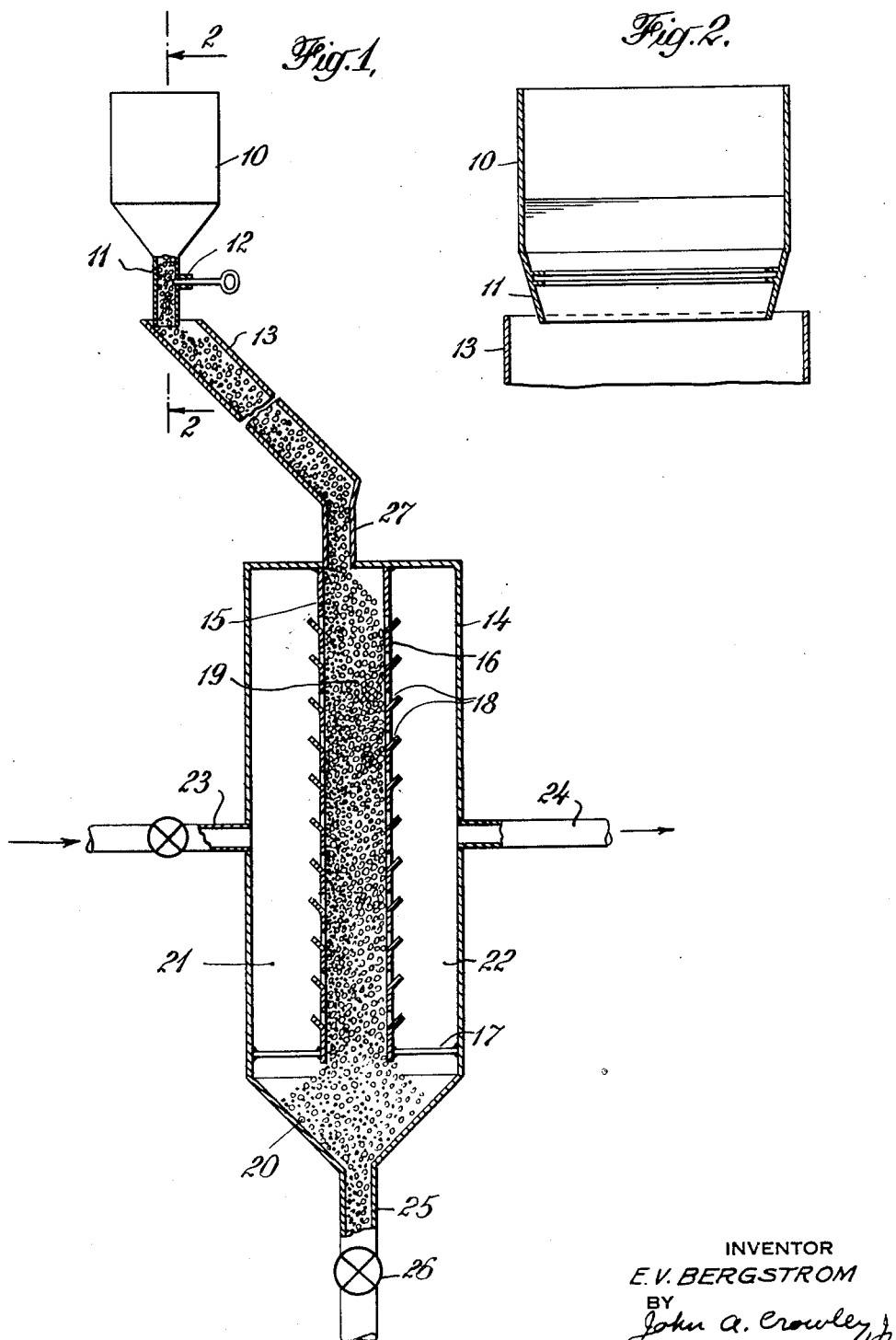

2,493,218

UNITED STATES PATENT OFFICE 2,493,218

GAS-SOLID CONTACT PROCESS

Eric V. Bergstrom, Short Hills, N. J., assignor to Socony-Vacuum Oil Company, Incorporated, a corporation of New York Application December 4, 1945, Serial No. 632,722

4 Claims. (Cl. 23—1)

The invention has to do with a method for conducting gas-solid contact operations. It is is particularly concerned with a method for conducting a process involving the contacting of a moving column of contact material with a transversely moving gas stream. Typical of such processes are the catalytic conversion, treating or reforming of hydrocarbons, gas adsorption, gas purification, treatment of solid materials, gas-solid heat exchange and catalyst regeneration. The contact material is usually adsorbent in nature and may take the form of natural or treated clay, silica gel, alumina, bauxites or synthetic associations of silica, alumina or silica and alumina to which small amounts of other materials such as certain metallic oxides may be added for special purposes. The contact material particles generally vary in size over a range of about 4 to 150 mesh as measured by a Standard Tyler screen analysis. For any particular process, however, the use of contact material particles falling within only a relatively narrow range of sizes may be desirable. For example, in many contact filtration processes, clay particles falling between 30 to 60 mesh by Tyler screen analysis are considered as normal sized particles. On the other hand, in certain continuous catalytic conversion processes normal sized particles may preferably fall within the range of about 4 to 8 mesh.

In many processes the contact material may be used over and over again as for example in a continuous catalytic process for hydrocarbon conversion wherein the particle form catalyst continuously passed as substantially compact columns cyclically through a conversion zone wherein it is contacted with gaseous hydrocarbons and through a regeneration zone wherein it is contacted with a combustion supporting gas acting to burn off from the catalyst carbonaceous contaminants deposited thereon in the conversion zone. In such processes due to gradual attrition of the moving contact material undersized particles or fines tend to accumulate on the moving mass. When the amount of contacting gas which must be passed through the contacting zone is very great, it is desirable and often necessary in order to accomplish the gas throughput without interference with the solid flow to pass the gaseous stream horizontally across the contacting zone, along the entire length thereof, transversely to the direction of flow of the column of moving contact material particles maintained therein. This is accomplished by the use of parallel, spaced apart foraminate partitions to define the contacting zone and the provision of gas inlet and outlet chambers extending along the sides of the contacting zone thus formed. If the contact material supplied to the contacting zone in such a process consists of a mixture of normal and undersized solid particles, the undersized particles tend to be entrained in the transversely moving gas stream and to be carried from the contacting zone in the effluent gas. This is not only undesirable because of contamination of the contacted gaseous products with solid material but also because it means the removal from the contact material stream of material which for economic reasons should remain therein or which can be more efficiently and economically removed from the contact material stream at another location in the system.

In order to prevent entrainment of undersized material from the contacting zone in such transverse flow processes, screens of small mesh size have been used as the foraminate partitions defining the contacting zones. While such screens will permit operation without excessive entrainment of undersized material for short periods of time, they give rise to undesirably higher pressured drops due to gas flow at the outset and they soon become plugged with solid particles causing complete failure of the operation.

A major object of this invention is the provision of a practical method wherein a column of particle form contact material may be contacted by a transversely moving high velocity stream of contacting gas without serious entrainment of undersized particles of contact material in the effluent gas stream.

Another object of this invention is the provision of an improved method for feeding contact material of different particle sizes to a gas-solid contacting zone adapted for transverse flow of gas and solid material. These and other objects will become apparent from the following description of this invention.

Heretofore in processes wherein the moving contact mass material is made up of particles of different sizes, it has been the practice to introduce the particles of different sizes into the contacting zone as uniformly mixed together as is practically possible. As has been shown hereinabove, such procedure results in excessive entrainment of undersized particles or fines in transverse flow processes involving high rates of gas flow. By the method of this invention, the stream of mixed contact material particles is passed downwardly over an inclined elongated feeding ramp or duct, and by this procedure the undersized particles or fines are caused to concentrate along the underside of the stream of contact material. The stream of contact material is then passed from the feeding ramp, without substantial mixing into the substantially vertical contacting zone so that material passing to one side of said zone contains a concentration of undersized particles or fines and material fed to the opposite side of said zone contains very few undersized particles. Contacting gas is then introduced to the contacting zone only along that side on which the undersized particles or fines are concentrated and withdrawn only along the opposite side thereof. Thus as the gaseous stream passes across the contact material column the normal sized particles act to effectively screen from the gaseous stream any entrained undersized particles or fines so as to prevent their being carried away from the contacting zone in the effluent gas.

In order to better understand the method of this invention, reference should be made to the drawings attached hereto of which Figure 1 is a sketch showing an apparatus arrangement adapted for conducting the method of this invention and Figure 2 is a sectional view taken along lines 2—2 of Figure 1. Both of these drawings are highly diagrammatic in form.

Turning now to Figures 1 and 2 which may be studied together, we find a supply hopper 10, which may be preferably rectangular in cross-sectional shape and is provided with a discharge duct 11 which extends substantially the entire width of the hopper in one direction so as to permit discharge of solid material in a stream having a rectangular cross-sectional shape. A sliding plate type valve 12 is provided in the duct 11. The duct or ramp 13 discharges into an elongated, inclined feeding duct or ramp which is preferably provided with a flat inclined floor and may be rectangular in cross-sectional shape. Below the feeding ramp 13 is positioned the gas-solid contacting vessel 14 which may be any of a number of cross-sectional shapes but which may preferably be of rectangular cross-section. Within the vessel 14 are provided two substantially vertical parallel, spaced apart partitions 15 and 16 extending across the entire width of vessel 14 in a direction perpendicular to the plane of Figure 1 and terminating near the bottom of vessel 14. The partitions may be supported at their opposite vertical ends from the opposite sides of vessel 14 and also by means of brace rods 17 located near the lower ends of said partitions. Upwardly extending louvered openings 18 are substantially uniformly distributed over the surface of the partitions 15 and 16 so as to permit gas flow through the partitions while preventing solid flow therethrough.

It will be apparent that the louvered openings take advantage of the normal angle of repose of the contact material in order to retain the same within the contacting zone. The opening being of substantially greater size than the contact material particles cannot become plugged with solid particles made up of fine mesh screens. The partition arrangement is such as to provide an elongated passage or contacting zone 19 for solid material flow throughout the major length of the central portion of vessel 14, a tapered solid discharge section 20 at the lower end of vessel 14, a gas inlet chamber 21 along one side of the solid passage and a gas outlet chamber 22 along the opposite side thereof. In place of the louvered partitions shown, arrangements of spaced inclined slots or angles may be substituted to define the passage 19. A gas inlet conduit 23 is provided connecting into gas inlet chamber 21 and a gas outlet conduit 24 is provided connecting into gas outlet chamber 22. A solid discharge conduit 25 bearing flow control valve 26 is provided at the lower end of vessel 14. The lower end of feeding ramp 13 is connected into the top of vessel 14 through duct 27 through which solid material may pass directly into flow passage 19. It will be understood that a plurality of contacting zones 19 with gas inlet and outlet zones on opposite sides thereof may be provided within a single vessel and suitable means for supplying contact material from an inclined feeding ramp into the upper end of each contact zone may be provided.

In operation contact material from hopper 10 is supplied through duct 11 to the upper end of feeding duct or ramp 13. The contact material may consist principally of normal sized particles falling within a predetermined range of sizes with a small percentage of undersized particles or fines, for example contact material consisting of 90% material ranging between 4 and 8 mesh and 10% less than 8 mesh size by Tyler Standard screen analysis. Of the 10% of undersized material, a substantial portion may be smaller than about 100 mesh. As the contact material passes downwardly through feeding duct 13, the smaller sized particles tend to settle to the bottom of the stream so that upon reaching vertical duct 27, the underside of the contact material stream in the feeding ramp contains a concentration of the undersized particles. The contact material then passes without substantial mixing through connecting duct 27 directly onto the upper end of the column of contact material confined between partitions 15 and 16. The material containing the concentration of undersized solid particles passes to that side of the passage 19 adjacent partition 15 and the gas inlet chamber 21, while the material passing to the opposite side of the passage 19 contains very few undersized particles. Contacting gas entering through conduit 23 distributes itself throughout the gas inlet chamber 21 and then passes through the louvered partition 15 and transversely across the column of solid material within passage 19. The rate of gas flow may be very high and sufficient to carry some of the undersized particles concentrated along partition 15. The rate of gas flow is not sufficient, however, to carry the normal sized solid particles; and the normal sized particles concentrated in the central portion of the passage 19 and especially in that portion of said stream adjacent partition 16, effectively screen from the gaseous stream the entrained smaller particles so as to effectively prevent entrainment of even undersized particles in the effluent gaseous stream passing through the louvered partition 16 into gas outlet chamber 22 and then through outlet conduit 24. Contacted particle form solid material is withdrawn from the lower end of passage 19 through drain section 20 and conduit 25 at a suitable rate controlled by means of valve 26.

The above described apparatus is well adapted for such gas-solid contacting processes as catalyst regeneration wherein carbonaceous deposits are burned at controlled temperatures of the order of 800 to 1200° F. by the action of a combustion supporting gas such as air. In such operations the temperature of the catalyst may be controlled by the use of cold flue gas recirculation along with the inlet air. Alternatively the catalyst temperature may be controlled by means of heat transfer tubes (not shown), arranged vertically throughout the length of the contacting zone or vertically or horizontally of spaced intervals along the length thereof. Cooling fluids may be circulated through such tubes to remove heat from the regeneration zone. The above apparatus is also well adapted for gas-solid heat exchange operations, for example an operation wherein a hot gas is passed through a column of relatively cold solid to quickly release the gas temperature.

If the contacting process involved is a conversion process such as a catalytic hydrocarbon cracking process, provision may be made for maintenance of an inert blanket gas at the upper and lower ends of the apparatus so as to prevent escape of reactant gas through the solid inlet duct or drain conduit.

It will be understood that the highly diagramatic drawings are intended only as showing the general apparatus arrangement and not the details of apparatus construction which may vary somewhat from one application of the invention to another. Such details of construction will be readily apparent to one skilled in the art after study of the description of this invention.

It will be apparent that by the method of this invention the maximum allowable amount of gas for unit of time which may be passed through the column of the contact material within the contacting zone without excessive entrainment of solid particles in the effluent gas is considerably higher than was possible in prior art processes since the rate of gas flow need be limited only below that which will carry the normal size particles whereas in the prior art processes the rate of gas flow must be limited below that which will carry the undersized particles. It will be understood that the term "gas" as used herein in describing and claiming this invention is used in a broad sense so as to include any material existing in the gaseous phase under existing operating conditions regardless of the phase of such material at normal atmospheric conditions. Obviously the maximum allowable rate of gas flow by the method of this invention will vary from one application to another, depending upon the particular characteristics of the gaseous and solid materials involved. Once having set upon the materials and conditions of temperature and pressure involved in any given application of the invention, the maximum allowable gas throughput may be determined either by calculation or by a simple routine experiment.

The required length of the feeding ramp or duct to provide proper segregation of undersized contact material depends to some extent upon the slope of the duct, increasing with increasing slope of the duct. The feeding ramp or duct should be positioned at an angle with the horizontal within the range of about 35 to 70 degrees and preferably within the range 35 to 50 degrees. For ducts positioned at a slope of 35 to 50 degrees with the horizontal, the proper duct length may be within the range of about 3 to 15 feet.

It will be understood that the specific examples of operation and application of this invention given hereinabove are intended by way of example only and are not intended as limiting the scope of this invention except as it may be limited by the following claims.

I claim:

1. In a gas-solid contacting process the steps: passing a stream of particle form solid contact mass material downwardly through an elongated, inclined feed zone until the smaller sized particles concentrate on the underside of said stream, directing said stream into a substantially vertical, confined contacting zone so that the underside of said stream containing the concentration of smaller particles passes to one side of said contacting zone and the upper side of said stream containing the larger particles passes to the opposite side of said zone, passing said contact material through said contacting zone as a substantially compact column, withdrawing contacted contact material from the lower section of said contacting zone, introducing contacting gas into said contacting zone along that side on which the smaller solid particles are concentrated, passing said gas through said column of contact material and withdrawing said gas from that side of said contacting zone on which the larger solid particles are concentrated.

2. The method for contacting gaseous material with particle form solid contact material containing some undersized fine material which method comprises: flowing a stream of said contact material into the upper end of an elongated, confined contacting zone, effecting a substantial segregation of the undersized fine material in said stream before it enters said contacting zone and directing the portion of said stream containing the segregated fines to one side of said contacting zone while directing the portion of said stream containing the normal sized material to the opposite side of said contacting zone, passing said contact material through said contacting zone as a substantially compact column, withdrawing contact material from the lower end of said column, introducing gaseous material substantially uniformly along that side of said column in which the undersized material is concentrated, passing said gaseous material transversely across said column and withdrawing gaseous material without substantial entrainment of undersized material from the opposite side of said column.

3. The method of conducting a gas-solid contacting operation which comprises: passing contact mass material made up of particles of predetermined normal size range and some undersized particles through an elongated confined zone as a substantially compact column of downwardly moving particles in which column, the undersized particles are substantially concentrated along one side and the normal sized particles along the opposite side, and passing a stream of contacting gas transversely across said column within said zone from the side thereof containing the concentration of undersized particles to the opposite side thereof so that the normal sized particles serve to screen the undersized particles from the gas stream and to prevent entrainment of undersized particles from said column in the effluent gas stream.

4. In a gas-solid contacting process the steps: passing a stream of particle form solid contact material comprising a major proportion of particles falling within a predetermined normal size range and a minor proportion of undersized fine particles downwardly through an elongated, flat bottomed feeding duct inclined at an angle within the range 35 to 70 degrees to effect the settling of the undersized particles to the bottom of said stream, directing said stream without substantial mixing onto the upper end of a confined column of said contacting material maintained throughout a substantially vertical contacting zone so that the undersized particles feed substantially all to one side of said column, withdrawing contact material from the lower end of said column at a controlled rate, introducing contacting gas to said zone along that side of said column containing the concentration of undersized material a velocity sufficient to carry said undersized particles, passing said gas transversely across said column wherein the undersized material is screened from said gaseous stream by the normal sized particles and withdrawing said gaseous stream from said zone along the opposite side of said column without substantial entrainment of the undersized particles.

ERIC V. BERGSTROM.

REFERENCES CITED

The following references are of record in the file of this patent:

UNITED STATES PATENTS

| Number | Name | Date |
|---|---|---|
| 691,209 | Tweedale et al. | Jan. 14, 1902 |